(12) United States Patent
Suzuki et al.

(10) Patent No.: US 6,608,649 B2
(45) Date of Patent: Aug. 19, 2003

(54) CAMERA SYSTEM, CONTROL METHOD, COMMUNICATION TERMINAL, AND PROGRAM STORAGE MEDIA, FOR SELECTIVELY AUTHORIZING REMOTE MAP DISPLAY USING MAP LISTING

(75) Inventors: Kazuko Suzuki, Yokohama (JP); Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/950,743

(22) Filed: Oct. 15, 1997

(65) Prior Publication Data

US 2002/0018123 A1 Feb. 14, 2002

(30) Foreign Application Priority Data

Oct. 15, 1996 (JP) .............................................. 8-272300

(51) Int. Cl.⁷ ............................................... H04N 5/232
(52) U.S. Cl. ............................... 348/211.8; 348/211.11; 348/143
(58) Field of Search ................................. 348/143, 156, 348/157, 158, 152, 153, 211, 213, 15, 552, 211.99–211.13, 207.1, 333.02, 333.05; 710/38, 40, 41, 42

(56) References Cited

U.S. PATENT DOCUMENTS

| 4,992,866 A | * | 2/1991 | Morgan | 348/159 |
|---|---|---|---|---|
| 5,583,796 A | * | 12/1996 | Reese | 348/152 |
| 5,600,368 A | * | 2/1997 | Matthews, III | 348/143 |
| 5,786,746 A | * | 7/1998 | Lombardo et al. | 348/14 |
| 6,137,485 A | * | 10/2000 | Kawai et al. | 348/211 |

FOREIGN PATENT DOCUMENTS

| EP | 0 729 275 | | 8/1996 | |
|---|---|---|---|---|
| EP | 0 729 275 A2 | * | 9/1996 | ............ H04N/7/18 |
| EP | 0 734 157 | | 9/1996 | |
| EP | 0 734 157 A2 | * | 9/1996 | .......... H04N/5/232 |
| JP | 08-265729 | | 10/1996 | |
| JP | 09-037356 | | 2/1997 | |

OTHER PUBLICATIONS

European Search Report (No. EP 20744) dated Jul. 30, 1999.
N. Thouvenot, Urban Video Surveillance System, 125 Electrical Communication (1994) 2nd Quarter, Paris, France pp. 143 to 147.

* cited by examiner

Primary Examiner—Tuan Ho
(74) Attorney, Agent, or Firm—Fitzpatrick, Cella, Harper & Scinto

(57) ABSTRACT

A display authorization area corresponding a user is selected from maps stored in a device, only the selected zone is displayed, and a camera which is not authorized for the user to perform information communication is inhibited from being displayed. With this arrangement, a camera control system having so excellent security that any user cannot see a place irrelevant to the user and cannot recognize the position of an installed camera is constructed.

27 Claims, 13 Drawing Sheets

FIG. 6

MAP TABLE

| MAP 1 | CAMERA 1, CAMERA 2, CAMERA 3 |
| MAP 2 | CAMERA 4, CAMERA 5, CAMERA 6, CAMERA 7, CAMERA 8 |
| MAP 3 | CAMERA 9, CAMERA 10, CAMERA 12, CAMERA 13 |
| MAP 4 | CAMERA 14 |
| ... | ... |
| MAP x | CAMERA P, CAMERA P+1, CAMERA q-1, CAMERA q |
| ... | ... |
| MAP n | ... |

FIG. 7

MAP ACCESS TABLE

| MAP | MAP AUTHORIZATION GROUP | MAP AUTHORIZATION USER |
|---|---|---|
| 1 | group1, group2, group3 | sato, suzuki |
| 2 | group2 | tanaka, kimura, mori, matui |
| 3 | group4, group5 | sato, tanaka, takeuchi, endo |
| 4 | group1, group2, group3, group4 | (null) |
| ... | ... | ... |

FIG. 8

GROUP TABLE

| GROUP | USER |
|---|---|
| group1 | saito, nakamura, yamada, kimura, mita |
| group2 | suzuki, hasimoto, maeda, hayasi, endo, ohno |
| group3 | kitano, mori, kawai, yosizawa, noda |
| ... | ... |

FIG. 9

CAMERA ACCESS TABLE

| CAMERA | CAMERA AUTHORIZATION GROUP | CAMERA AUTHORIZATION USER |
|---|---|---|
| 1 | group1, group2, group3 | sato, suzuki |
| 2 | group1, group2, group3 | (null) |
| 3 | group1, group2, group3 | sato, tanaka, takeuchi, endo |
| 4 | group4 | sato, nakasima, mita |
| ... | ... | ... |

FIG. 10
FIG. 10A
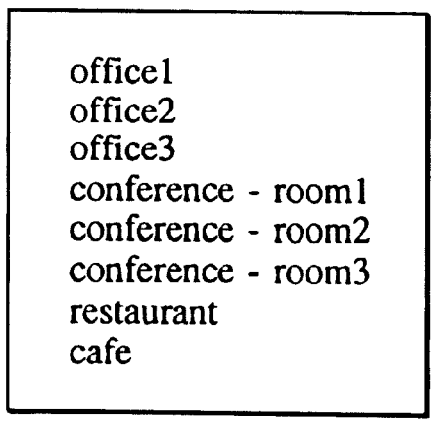
(MAP LIST OF user A)
FIG. 10B
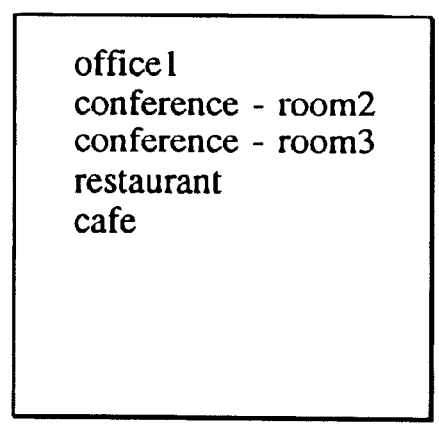
(MAP LIST OF user B)

FIG. 11
FIG. 11A
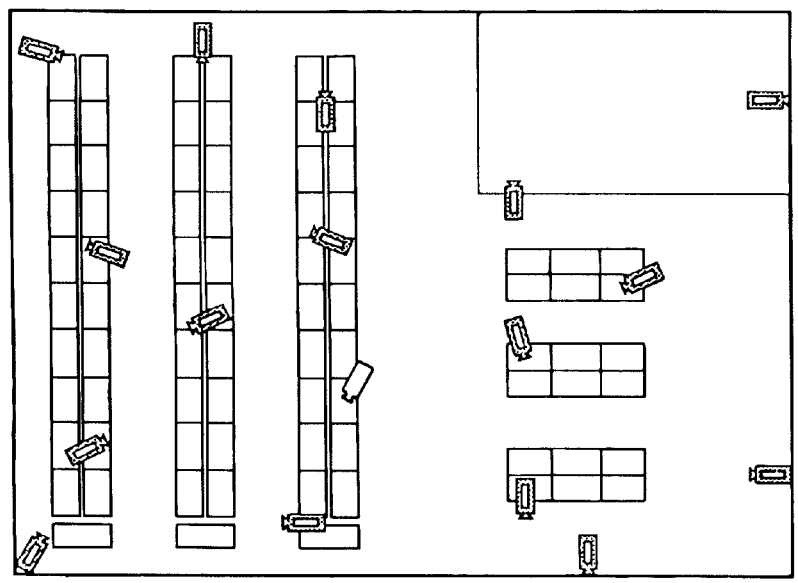
(MAP WINDOW OF user A)
FIG. 11B
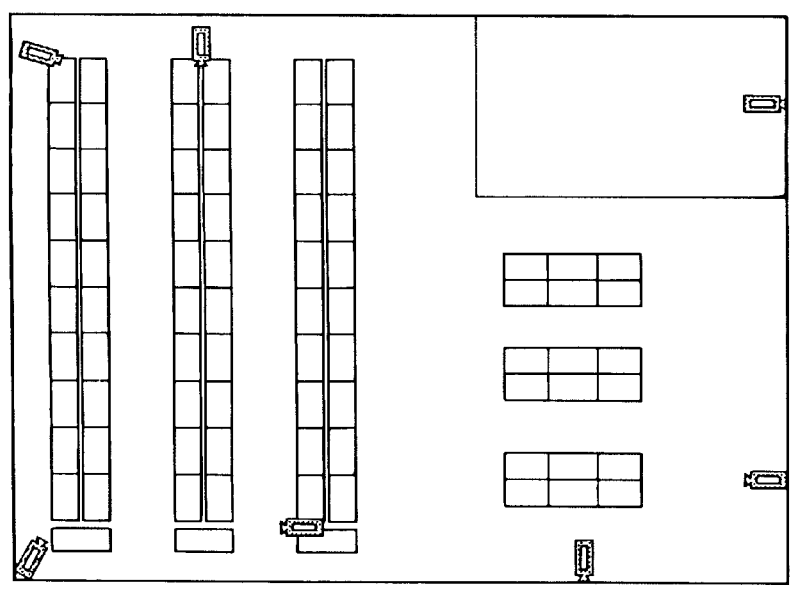
(MAP WINDOW OF user B)

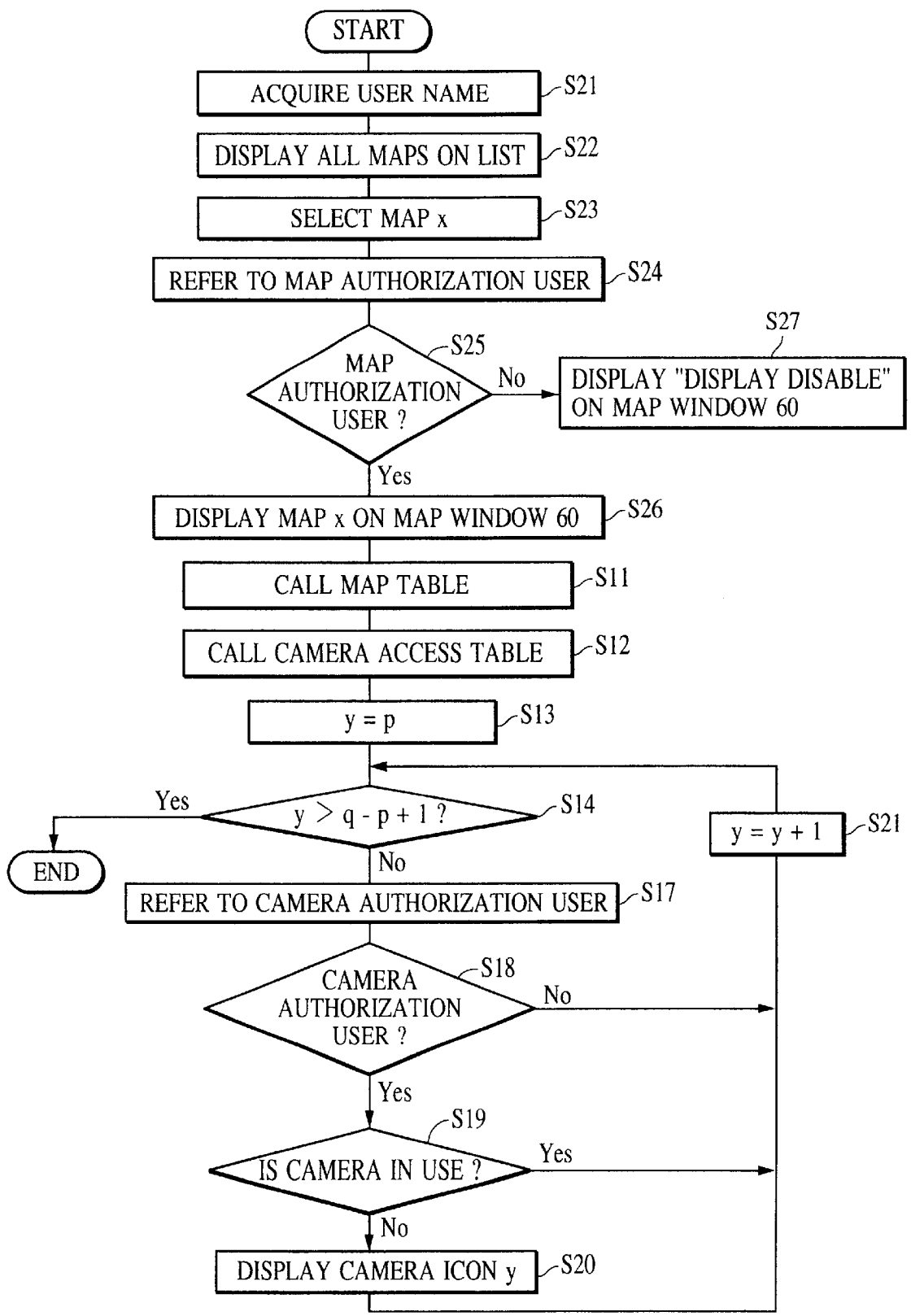

CAMERA SYSTEM, CONTROL METHOD, COMMUNICATION TERMINAL, AND PROGRAM STORAGE MEDIA, FOR SELECTIVELY AUTHORIZING REMOTE MAP DISPLAY USING MAP LISTING

BACKGROUND OF THE INVENTION

1. Field of the Invention

The present invention relates to a camera control system which is suitably used in, e.g., a monitor camera or the like.

2. Description of the Related Art

A large number of cameras and computers for controlling these cameras may be arranged in a building or the like to form a network, thereby making it possible to transmit a video image between arbitrary points in the network. For example, the present applicant has proposed such a network or system including, a camera control system to be used in a television conference system, a remote monitor system, or the like.

In such a camera control system, a photographing direction and zoom magnification of a camera at an arbitrary remote location may be remote-operated from a control location or another arbitrary location in the network, and a video signal from the camera may be received through the network, so that a pick-up image of the camera can be displayed at various locations in the network.

In the camera control system described above, as the number of cameras to be operated increases, the positions where the cameras are installed must be easily identifiable.

Therefore, the present applicant has proposed a network or scheme that displays camera icons serving as indexes indicating the positions of the cameras superposed on a plurality of maps.

However, in the above camera control system, since the camera icons superposed on the maps always are displayed to indicate the positions where the cameras are set, all users who access the system can see the arrangement of the cameras.

More specifically, in a conventional camera control system, since all the users can see the locations of all of the camera icons superposed on the maps, even those icons that are not relevant to all users, they can see the positions of all the installed cameras and remote-operate these cameras.

In the future, as these systems are designed with a larger number of cameras installed at various positions, and these cameras variously are used by more people, security aspects become important considerations.

SUMMARY OF THE INVENTION

The present invention has been made in consideration of the above problems, and has as its object to construct a camera control system which is easily operated and provides excellent security, where unnecessary information can be prevented from leaking to unauthorized persons.

In order to achieve the above object, according to one aspect of the present invention, there is provided a camera control system for supplying a control command to at least one camera to control the at least one camera, the system comprising: map display means for displaying a map; index display means for displaying superposed on a map displayed by the map display means at least one index respectively indicating a position of the at least one camera on the map displayed by the map display means; camera authorization setting means for setting an authorization state of a camera, the authorization state indicating that the camera is authorized to be displayed as an index corresponding to the camera on a map displayed by the map display means; and first index display inhibition means for inhibiting the index display means from displaying an index corresponding to a camera other than a camera having an authorization state set by the camera authorization setting means which authorizes the camera to be displayed as an index on the map displayed by the display means.

According to another aspect, there is provided a camera control system for supplying a control command to at least one camera to control the at least one camera, the system comprising: map display means for displaying a map; camera authorization setting means for setting an authorization state of a camera, the authorization state indicating that the camera is authorized to perform information communication between the camera and the system; and index display means for displaying superposed on a map displayed on the map display means at least one index, each index indicating a respective one of the at least one camera, an index corresponding to a camera having a positive authorization state set by the camera authorization setting means being displayed different from an index corresponding to a camera not having a positive authorization state.

According to still another aspect, there is provided a camera control system for supplying a control command to at least one camera to control the at least one camera, the system comprising: map storage means for storing at least one type of map for indicating a location of the at least one camera; map authorization setting means for setting an authorization state of a map, the authorization state indicating whether the map is authorized to be displayed; list display means for displaying in a list a map having an authorization state set by the map authorization setting means authorizing display of the map, and for selecting a map displayed by the list display means; and map display means for displaying a map selected by the list display means.

According to still another aspect, there is provided a camera control system for supplying a control command to at least one camera to control the at least one camera, the system comprising: map storage means for storing at least one map for indicating a location of the at least one camera; map authorization setting means for setting an authorization state of a map, the authorization state indicating whether a map is authorized to be displayed; list display means for displaying in a list the at least one map stored in the map storage means, and for selecting a map displayed in a list by the list display means; map display means for displaying a map selected from the list display means; and map display inhibition means for inhibiting the map display means from displaying a map having an authorization state set by the map authorization setting means that does not authorize display of the map at the map display means.

According to still another aspect, there is provided a method of controlling a camera control system for supplying a control command to at least one camera to control the at least one camera, the method comprising: displaying a map for indicating a location of the at least one camera on the map; displaying superposed on a map displayed in the map display step at least one index for respectively indicating a position of the at least one camera on the map displayed in the map display step; setting an authorization state of a camera, the authorization state indicating whether the camera is authorized to be displayed as an index corresponding to the camera on a map displayed in the map display step;

and inhibiting the superposed display on a map to be displayed in the map displaying step of an index corresponding to a camera other than a camera having an authorization state set in the camera authorization setting step which authorizes the camera to be displayed as an index on the map displayed in the map displaying step.

According to still another aspect, there is provided a method of controlling a camera control system for supplying a control command to at least one camera to control the at least one camera, the method comprising: displaying a map for indicating a location of the at least one camera; setting a camera authorization state of a camera, the authorization state indicating that the camera is authorized to perform information communication between the camera and the system; and displaying superposed on a map displayed in the map displaying step at least one index, each index indicating a respective one of the at least one camera, an index corresponding to a camera having a positive authorization state set in the camera setting step being different from an index corresponding to a camera having a positive authorization state.

According to still another aspect, there is provided a method of controlling a camera control system for supplying a control command to at least one camera to control the at least one camera, the method comprising: storing at least one map for indicating a location of the at least one camera; setting an authorization state of the at least one map, the authorization state indicating whether the at least one map is authorized to be displayed; displaying in a list the at least one map having an authorization state set in the map authorization setting step, and selecting a map from the list; and displaying a map selected from the list display step.

According to still another aspect, there is provided a method of controlling a camera control system for supplying a control command to at least one camera to control the at least one camera, the method comprising: storing at least one map for indicating a location of the at least one camera; setting an authorization state of a map, the authorization state indicating whether the map is authorized to be displayed in the map storing step; displaying in a list the at least one map stored in the map storing step, and selecting a map from the list; displaying a map selected in the list displaying step; and inhibiting the map displaying step when a map other than a map having an authorization state set in the map authorization setting step is selected in the list displaying step.

According to still another aspect, there is provided a video communication terminal for a camera control system for supplying a control command to at least one camera to make it possible to control the camera, comprising: map display means for displaying a map for indicating a position where the at least one camera is located; index display means for displaying an index for indicating the position of the at least one camera such that the index overlaps the map displayed by the map display means; reception means for receiving information related to a camera authorized to perform information communication from the at least one camera; and index display inhibition means for inhibiting an index corresponding to a camera other than the camera authorized to perform information communication from being displayed on the basis of the information related to the camera and received by the reception means.

According to still another aspect, there is provided a video communication terminal for a camera control system for supplying a control command to at least one camera to make it possible to control the camera, comprising: map display means for displaying a map for indicating a position where the at least one camera is located; reception means for receiving information related to a camera authorized to perform information communication from the at least one camera; and index display means for displaying an index corresponding to the camera authorized to perform information communication as an index different from an index corresponding to another camera.

According to still another aspect, there is provided a video communication terminal for a camera control system for supplying a control command to at least one camera to make it possible to control the camera, comprising: first reception means for receiving information related to a map authorized to be displayed from at least one type of map; list display means for displaying a map as a list on the basis of the information related to the map received by the first reception means; and map display means for displaying a map selected from the list display means.

According to still another aspect, there is provided a video communication terminal for a camera control system for supplying a control command to at least one camera to make it possible to control the camera, comprising: first reception means for receiving information related to a map authorized to be displayed from at least one type of map; list display means for displaying a map as a list; map display means for displaying a map selected from the list display means; and map display inhibition means for inhibiting a map from being displayed by the map display means when a map other than a map authorized to be displayed from the list display means.

According to still another aspect, there is provided a storage media in which a program for executing an operation process of a video communication terminal for a camera control system for supplying a control command to at least one camera to make it possible to control the camera is stored, executing the processes of: displaying a map for indicating a position where the at least one camera is located; displaying an index for indicating the position of the at least one camera such that the index overlaps the map displayed by map display means; receiving information related to a camera authorized to display the index corresponding to the camera from the at least one camera; and inhibiting an index corresponding to a camera other than the camera authorized to display the index corresponding to the camera from being displayed on the basis of the information related to the camera and received by reception means.

According to still another aspect, there is provided a storage media in which a program for executing an operation process of a video communication terminal for a camera control system for supplying a control command to at least one camera to make it possible to control the camera is stored, executing the processes of: displaying a map for indicating a position where the at least one camera is located; receiving information related to a camera authorized to perform information communication from the at least one camera; and displaying an index corresponding to the camera authorized to perform information communication as an index different from an index corresponding to another camera.

According to still another aspect, there is provided a storage media in which a program for executing an operation process of a video communication terminal for a camera control system for supplying a control command to at least one camera to make it possible to control the camera is stored, executing the processes of: receiving information related to a map authorized to be displayed from at least one type of map; displaying a map as a list on the basis of the information related to a received map; and displaying a map selected from the map displayed as a list.

According to still another aspect, there is provided a storage media in which a program for executing an operation process of a video communication terminal for a camera control system for supplying a control command to at least one camera to make it possible to control the camera is stored, executing the processes of: receiving information related to a map authorized to be displayed from at least one type of map; displaying a map as a list; displaying a map selected from the map displayed as a list; and inhibiting the map from being displayed when a map other than the map authorized to be displayed.

Other objects and features of the present invention will be apparent according to the following specification and drawings.

BRIEF DESCRIPTION OF THE DRAWINGS

FIG. 6 is a view showing an example of a map table.

FIG. 7 is a view showing an example of a map access table.

FIG. 8 is a view showing an example of a group table.

FIG. 9 is a view showing an example of a camera access table.

FIG. 10, including FIG. 10A and FIG. 10B, is a view showing a display example of map lists.

FIG. 11, including FIG. 11A and FIG. 11B, is a view showing a display example of map windows.

FIG. 15 is a flow chart showing an operation process of the video communication terminal.

DESCRIPTION OF THE PREFERRED EMBODIMENTS

Figure 1:
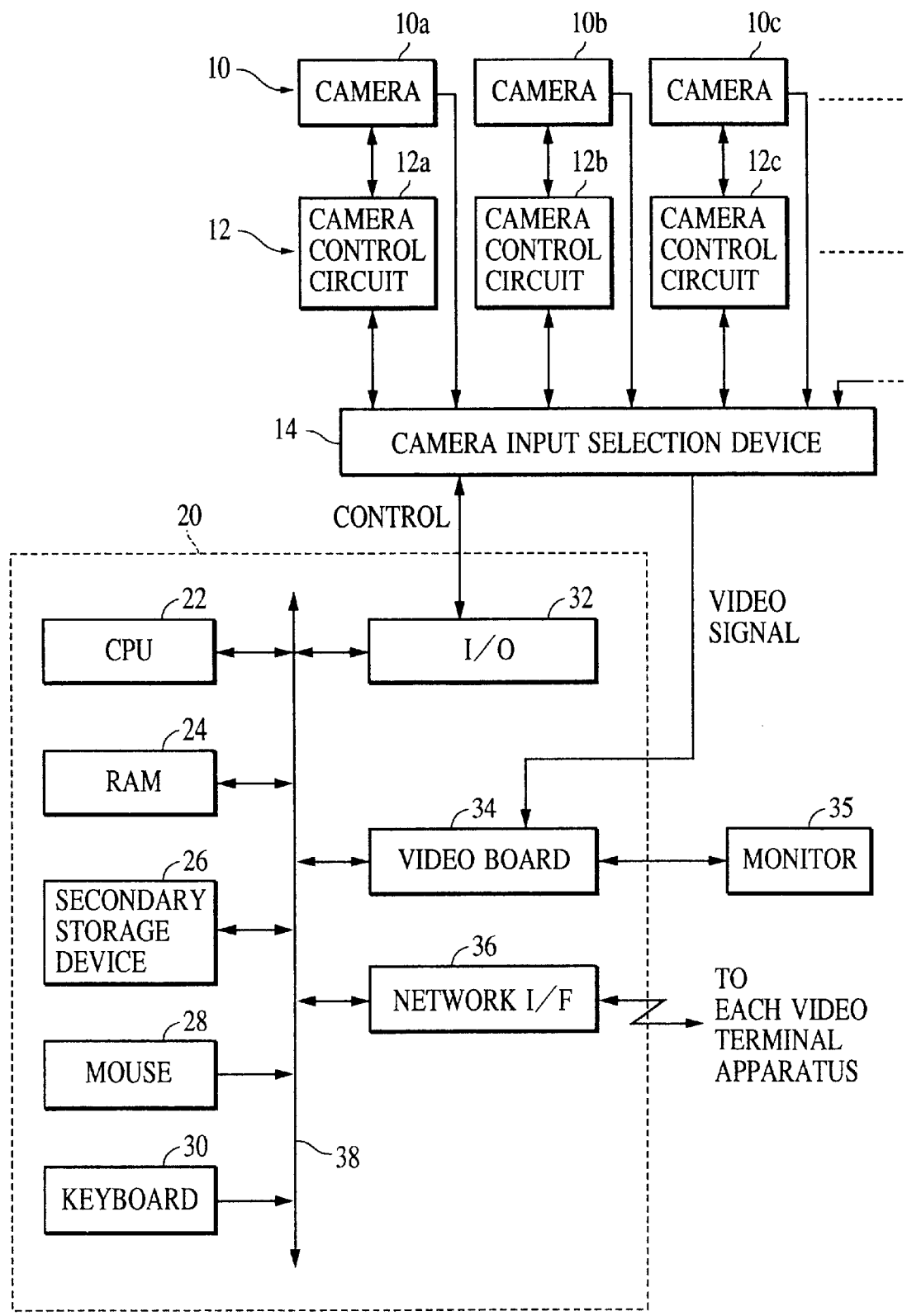
FIG. 1 is a block diagram showing the arrangement of a video communication terminal.

FIG. 1 is a schematic block diagram showing an embodiment of the present invention including an arrangement of a video communication terminal serving as a computer system to which a plurality of camera devices are connected.

Figure 2:
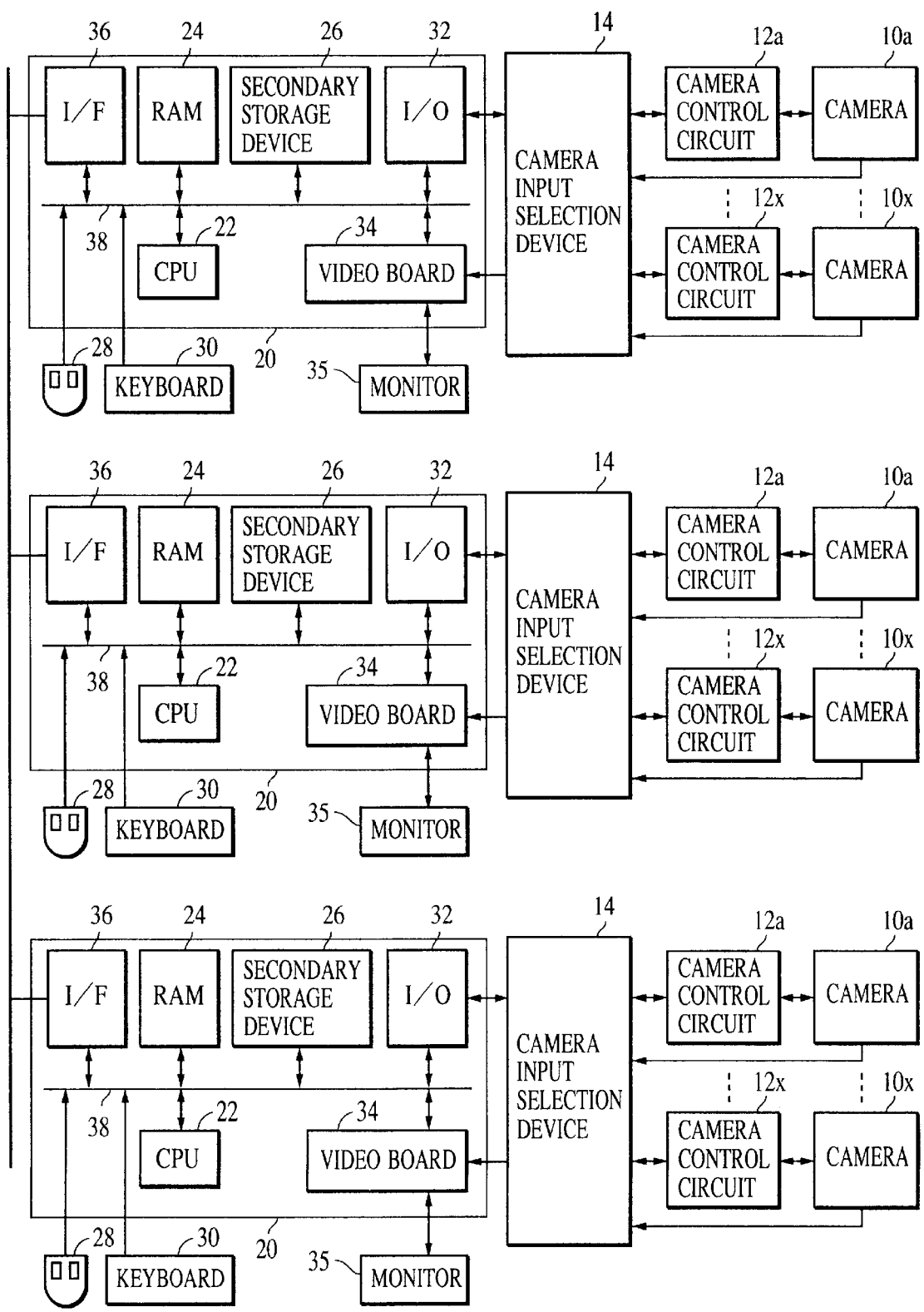
FIG. 2 is a block diagram showing the arrangement of video communication terminals which are connected to each other through a network.

At least one computer in the arrangement shown in FIG. 1 is connected to another computer through a computer network, as shown in FIG. 2, to form a camera control system.

Referring to FIG. 1, camera control circuits 12a, 12b, 12c . . . control the panning, tilting, zooming, focus adjustment, aperture, and like functions of respective cameras 10a, 10b, 10c . . . corresponding to the camera control circuits 12a, 12b, 12c . . . through signal lines such as RS-232C cables according to external control signals.

A camera input selection device 14 selectively monitors the camera control circuits 10a, 10b, 10c . . . to determine whether the camera input selection device 14 receives output signals from the camera control circuits 10a, 10b, 10c . . . (Although video signals and audio signals often are used in cameras with microphones, video signals alone are exemplified in this embodiment.).

A video communication terminal 20 transmits a control command to a desired camera control circuit, e.g., camera control circuit 12b, through the camera input selection device 14, thereby controlling camera 10b, which is connected to camera control circuit 12b. The video communication terminal 20 transmits a video signal from a selected camera to the network and receives a video signal from the network.

A CPU 22 outputs various control commands to control the video communication terminal 20. The CPU 22 continuously controls the functions of a camera control server 54, video transmission/reception software 58, and a camera control client 56 which will be described later (see FIG. 3). A RAM 24 temporarily stores management information called from a camera management server 50 (see FIG. 3, described below) or a secondary storage device 26.

The secondary storage device 26 also stores various pieces of information, e.g., camera position information data, camera photographing range data, an access table (to be described later), and the like, related to other cameras connected to the camera management server 50 (to be described later) through the network.

A mouse 28 is a pointing device for performing an operation on a monitor 35. Reference numeral 30 denotes a keyboard for performing various setting operations or remote-operations for the cameras.

An I/O port 32 is connected to the camera input selection device 14 to supply a camera control command or the like to the camera input selection device 14.

A video board 34 receives an output video signal from a camera selected by the camera input selection device 14 and displays a video image output from the controlled camera on monitor 35.

A network I/F 36 connects the video communication terminal 20 to a communication network such as the internet or a LAN. The network I/F 36 makes it possible to transmit/receive a camera control signal from a remote location to the video communication terminal 20 through the network. A bus 38 connects the respective devices in the video communication terminal 20 to each other.

The camera input selection device 14 selects at least one of control signals and video output signals connected to the camera control circuits 12a, 12b, 12c . . . , supplies a selected video output to the video board 34, and logically connects a selected control signal line to the I/O port 32. As a matter of course, if only one camera is connected, the camera input selection device 14 is not necessary, and the camera control circuit 12 to which the camera 10 is connected is directly connected to the I/O port 32. The format of the video signal may be a standardized signal such as an NTSC signal using, e.g., a luminance color-difference separation scheme.

The video board 34 receives a video signal selected by the camera input selection device 14. The received video signal is displayed on a predetermined window of the monitor 35 as a moving image, and then is transmitted to another video communication terminal.

The video communication terminal 20 shown in FIG. 1 is connected in a network through the I/F 36, as shown in FIG.

2, to other video communication terminals 20 installed at various locations.

Referring to FIG. 2, each of the video communication terminals 20 constituting the network is shown as having the same arrangement. However, the video communication terminals 20 need not have the same arrangement. For example, video communication terminals to which only one camera is connected may be used. In this case, the CPU 22 transmits an operation command to the camera control circuit 12 without using the camera input selection device 14.

A video communication terminal to which no camera is connected (i.e., a video communication terminal having only a function of remote-operating a camera connected to another terminal to display a video image) may also be used. In this case, the camera input selection device 14, the camera control circuit 12, and the camera 10 may be removed from the video communication terminal. If a video communication terminal having a function corresponding to the function of a management server (to be described later) has no function of displaying a video image, the video communication terminal can execute an operation process according to this embodiment.

The network used in this embodiment is a LAN/WAN having a transmission bandwidth sufficient to transmit digital moving image data and a camera control signal.

The moving image data to be transmitted through the network is generally compressed prior to being transmitted. Conventional schemes used as a moving compression scheme are well known to the art, and a description thereof will be omitted.

As described above, the video board 34 supplies a video signal received from a camera to the monitor 35 not only to display the video signal as a video image but also to A/D-convert the video signal and supply the A/D converted signal to the CPU 22. The CPU 22 packets the video signal to output the packet signal to the network through the I/F 36.

A signal for transmitting a camera operation instruction, a camera switching instruction, and the like, are packeted, and packeted signals are transmitted to the designated video communication terminals 20 through the network.

When a video communication terminal 20 receives a packet video signal, a packet camera operation signal, and a packet camera switching signal, the video communication terminal 20 which receives a command equivalently executes the commands of the received signals and an internal command.

Figure 3:
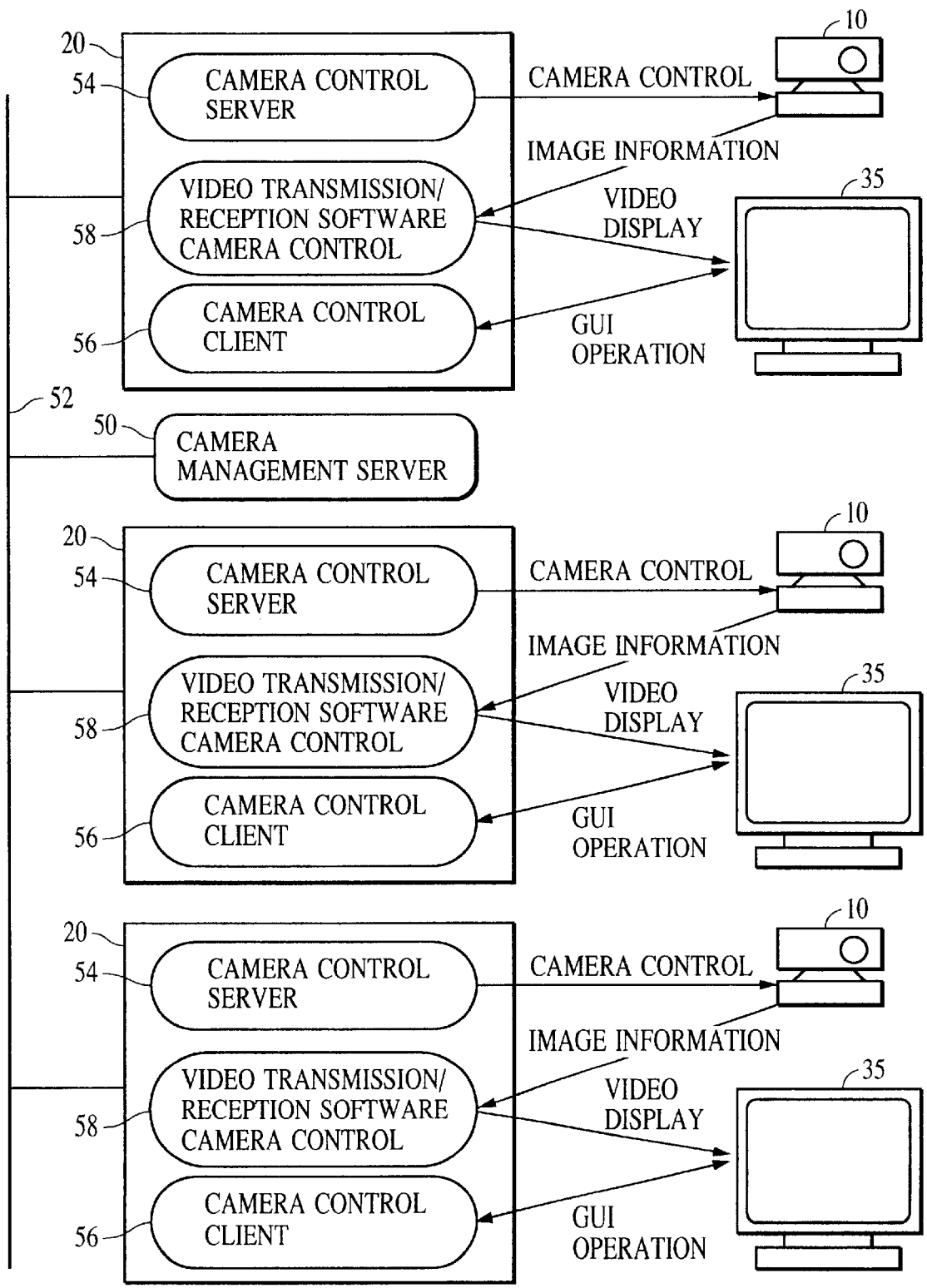
FIG. 3 is a block diagram showing the arrangement of software.

FIG. 3 is a block diagram showing an arrangement of software according to this embodiment. Referring to FIG. 3, a plurality of video communication terminals 20 which can remote-operate cameras associated with the video communication terminals 20 and the camera management server 50 (to be described later) are connected to each other via a network 52.

A camera control signal transmitted through the network, or a camera control signal (when a plurality of cameras are connected to the video communication terminal, including a selection signal for selecting camera control signals from the cameras) input by the mouse 28 or the keyboard 30 is supplied to the camera control server 54 for controlling the cameras 10 (10a, 10b, 10c . . . ).

The camera management server 54 drives the cameras on the basis of a command of the camera control signal obtained through the network 52.

The video transmission/reception software 58 displays an image in an image pickup direction in which the camera is driven by the camera control server 54 on the monitor 35 of the video communication terminal 20 or transmits/receives a signal to/from another video communication terminal 20 via the network 52.

The camera management server 50 manages all the cameras 10 (10a, 10b, 10c . . . ) included in the video communication terminal 20 connected to the network 52 to have present information such as camera names, host names (user names), group names to which the users belong, map names, installation positions (positions on the maps), a map table (to be described later), and an access table for the maps and the cameras.

Registration and cancellation of camera remote-operation inhibition for all users of a camera 10 are set via the camera management server 50. In the camera management server 50, management information for the camera remote-operation inhibition may be periodically output to the camera control client 56 of the video communication terminal 20, or output in response to a request of a user.

The camera control client 56 sets inhibition of remote-operation of a predetermined camera connected to the network on the basis of management information from the camera management server 50.

In addition, the camera control client 56 inhibits the display on a map of an icon corresponding to a camera inhibited from being remote-operated from the subject video communication terminal.

The camera control client 56 updates camera position information data, camera graphic data, map data, access tables (to be described later), camera remote-operation inhibition, and the like, which are stored in the secondary storage device 26, on the basis of new management information obtained from the camera management server 50. On the basis of the management information obtained from the camera management server 50, the camera control client 56 updates the display state of camera icons displayed on the monitor 35 in real time.

Figure 4:
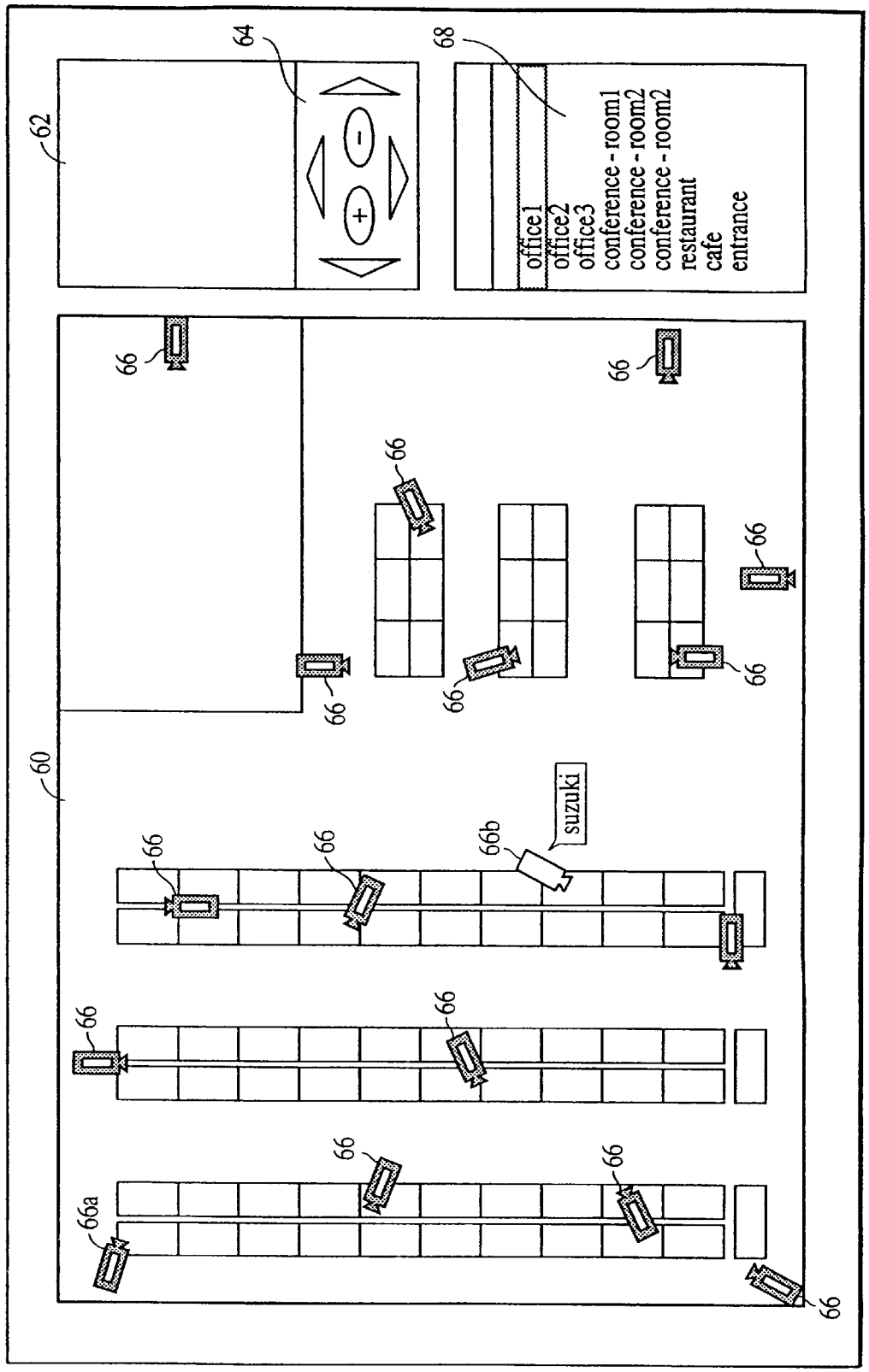
FIG. 4 is a view showing an example of a display screen.

FIG. 4 shows an example of a screen displayed on the monitor 35 by the camera control client 56 according to the present invention.

Referring to FIG. 4, a map window 60 displays camera icons indicating the installation positions and directions of the cameras superposed on a map showing the installation positions of the operable cameras.

A camera video window 62 displays a video image from one selected camera. A camera operation panel 64 comprises camera control buttons to operate panning, tilting, zooming, and the like of the selected camera. A map list 68 displays a list of maps of various places, and a plurality of maps selected from the list can be displayed on the map window 60 simultaneously or one at a time.

In FIG. 4, a map of "office 1" showing the seat arrangement of office 1, is selected from the map list 68, and camera icons 66 indicating the arrangement positions and image pick-up directions of the respective cameras installed in "office 1" are displayed on the map.

In order to make user recognition easy, the camera icons 66 may be displayed with different colors such that the operation status of a camera selected for video display or remote-operation, a camera used by another user, a camera used by nobody, and the like can be discriminated from each other.

For example, on the basis of the management information from the camera management server 50, the CPU 22 may display the icon of the camera selected by a user on the map window 60 as a red icon (66a), and display the icon of a camera used by another user on the map window 60 as a black icon (66b). Here, a user's name "Suzuki" is displayed on the map window 60, and the CPU 22 controls the map window 60 such that one user can recognize who is using a specific camera.

Also, the icon of a camera which is being used by a user himself/herself may be flickered or changed in shape.

On the basis of management information from the camera management server 50, only a map which a user using the camera control client 56 is authorized to access is displayed in the map list 68. Similarly, only camera icons authorized to be accessed by the subject user are displayed superposed on the map window 60.

Here, "access" to a map indicates that the map is displayed, and "access" to a camera means that operations such as display of a video image from the camera and panning or tilting of the camera can be performed.

For example, in the map list 68 in FIG. 4, as in the map list of user A in FIG. 10A and the map list of user B in FIG. 10B, lists to be displayed by different users are changed according to their authorization status. With this arrangement, a camera control system can be provided which does not even inadvertently disclose the existence of a map which should not be known by unauthorized users.

The map window 60 in FIG. 11 displays the same map as that of "office 1" shown in FIG. 4. In this case, as shown in the map of user A in FIG. 11A and in the map of user B in FIG. 11B, displays of camera icons are changed depending on the user's authorization status.

The camera operation panel 64 comprises two operation buttons, i.e., a rotating operation button for panning or tilting and a button for a zooming operation. These buttons may be operated to perform a rotating operation and a zooming operation to an arbitrarily designated camera 10 (10a, 10b, 10c . . . ).

For example, when a camera is accessed from a video communication terminal 20, a target camera icon is double-clicked using the mouse 28. According to this operation, the camera control client 56 requests a control authorization of the camera from the camera management server 50, and the camera management server 50 checks whether the control authorization has been set for another user. If the control authorization of the camera has not being given to another user, then the camera management server 50 authorizes a remote-operation of the camera 10 (10a, 10b, 10c . . . ), otherwise, the control authorization request is rejected.

When camera control is authorized by the camera management server 50, an output video image from the camera is displayed on the camera video window 62, thereby making an operation by the camera operation panel 64 possible.

When a selected camera is remote-operated by another user, the camera control client 56 may perform control such that the icon of the camera is not displayed. This can be achieved in the following manner. That is, the camera management server 50 recognizes the operation states of all the cameras connected to the network and supplies the information of the operation states to the video communication terminals. With this arrangement, only camera icons which can be reliably used can be displayed.

Figure 5:
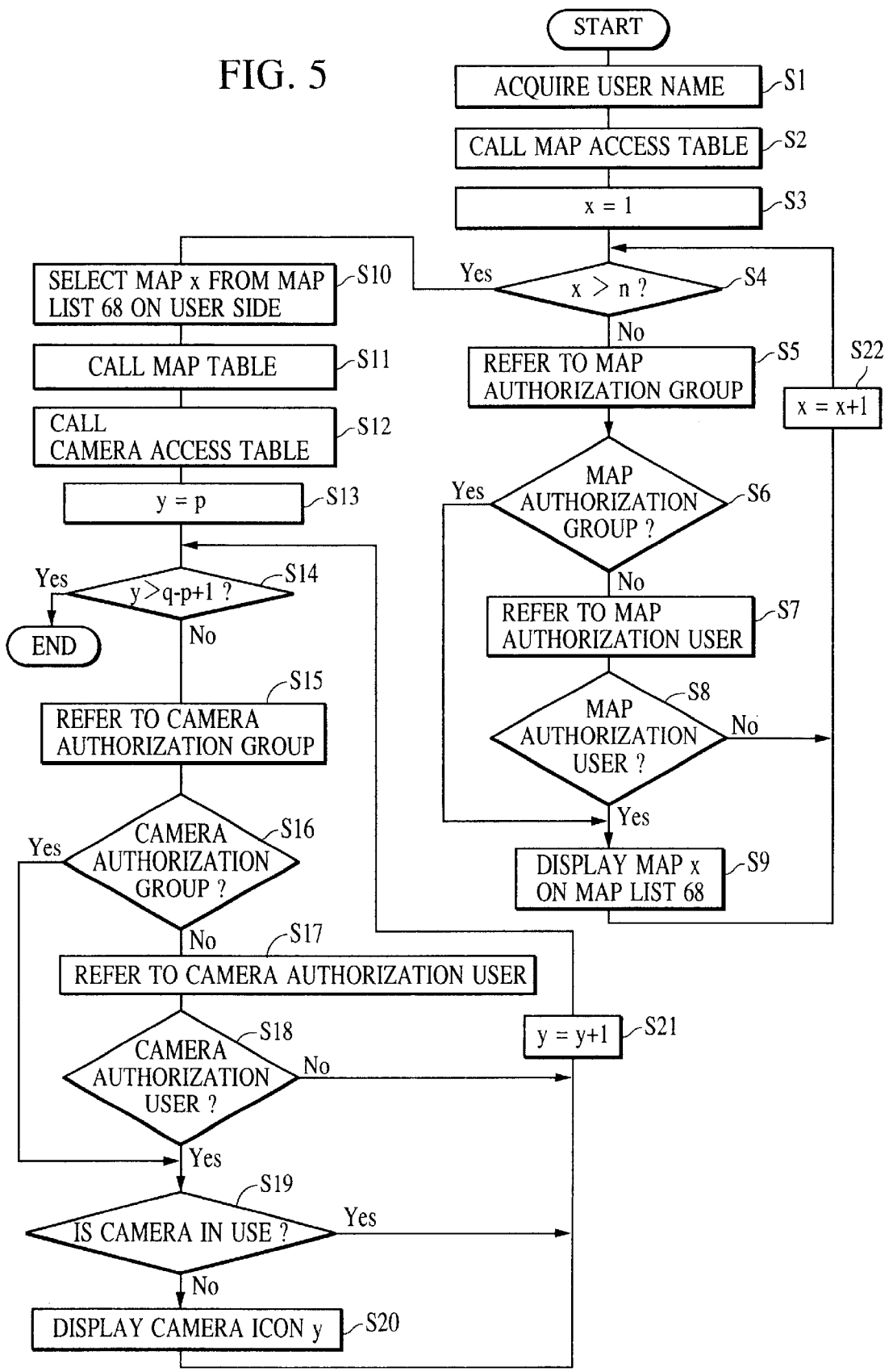
FIG. 5 is a flow chart showing an operation process of the video communication terminal.

FIG. 5 is a flow chart showing an operation process of the video communication terminal 20 related to the display process of the map list 68 and the map window 60. Here, n maps registered in the camera management server 50 are defined as map 1, map 2, . . . , map n.

Referring to FIG. 5, the camera control client 56 displays only accessible maps as a list when the map list 68 is displayed, and executes the following process to display a camera icon corresponding to an authorized camera.

The camera control client 56 acquires a user name step S1. In step S2, the camera control client 56 calls a map access table and a group table included in the secondary storage device 26 in which management information output from the camera management server 50 is stored.

The map access table has an arrangement shown in FIG. 7. In the map access table, an authorization group and an authorization user are set for each map. More specifically, a map which is inhibited from being displayed for each user and each group is excluded. The group table has an arrangement shown in FIG. 8. As soon as the camera control client 56 acquires a user name, the camera control client 56 can acquire a group name to which the user belongs with reference to the group table.

In step S3, map 1, map 2, . . . , map x, . . . , map n called in step S2 are sequentially checked from x=1, i.e., map 1, to determine whether access to these maps is authorized by the camera control client 56 (S3).

In step S5, the camera control client 56 refers to the map authorization group on the map access table shown in FIG. 7.

In step S6, for example, a user is "Saito", and the camera control client 56 checks whether a group to which "Saito" belongs is included in the authorization group. In step S9, a map included in the authorization group is displayed in the map list 68.

In map 1, when the group to which the user belongs is not included in the authorization group, the camera control client 56 refers to the map authorization user on the map access table in FIG. 7 (S7) to check whether the user which is not included in the authorization group is included in the camera authorization user list (S8).

If the map is included in the authorization user list, then the map is displayed on the map list 68 (S9).

Upon completion of a check of map 1, x=1+1=2 is counted in step S22, and an authorization check for map 2 is started.

The above check is sequentially performed up to map n. When x>n is established in step S4, authorization check for maps by the camera control client 56 is completed.

When a map selected by a user is displayed on the map window 60, the following process is performed to display only a camera which can be accessed by the user on the map as a camera icon.

When the user selects a certain map x from the map list 68 in step S10, in steps S11 and S12, the camera control client 56 calls the map table shown in FIG. 6 and the camera access table shown in FIG. 9, which tables are stored in the secondary storage device 26.

The camera control client 56 sequentially checks all (q−p+1) cameras, i.e., camera p, camera p+1, . . . , camera y, . . . , camera q−1, and camera q which are registered from the map table shown in FIG. 6 into map i, from y=p, i.e., camera p (S13) to determine whether the displays of the camera icons are authorized for the subject user.

FIG. 9 is a camera access table which is used to install camera icons displayed on the map window 60 and to install a camera for authorizing information communication.

The camera control client 56 refers to a camera authorization group on the camera access table in FIG. 9 (S16). If the camera is included in an authorization group to which "Saito" belongs, then the camera control client 56 determines whether the camera is in use by another terminal (S19). If the camera is not in use, then the icon of the camera is displayed on the map window 60 (S20).

If a camera is not included in the camera authorization group, then the camera control client 56 refers to the camera authorization user on the camera access table in FIG. 10 (S17) to check whether the camera is included in the camera authorization user list (S18). When a camera which does not belong to the camera authorization group is included in the camera authorization user list, the camera control client 56 checks whether the camera is in use (S19). If the camera is not being used by another users terminal, then the icon of the camera is displayed on the map window 60, superposed on the map (S20).

In step S21, upon completion of the authorization check for camera p, y p+1 is calculated, and the camera control client 56 starts a display authorization check for the camera p+1.

The camera control client 56 sequentially performs the above process for all of the cameras on map x from camera p to camera q−p+1.

When y>q−p+1 is established, i.e., when the above process is performed for all of the cameras on map x, display of a map and camera icons superposed on the map is completed.

When the above system is used, respective users do not open maps which are not related to the users. In addition, unrelated camera positions on the map are not displayed. In this manner, a video communication terminal which has flexibility and provides excellent security, and a camera control system can be provided.

In the embodiment of the above-mentioned flow chart in FIG. 5, a camera icon which is in use by another terminal is not displayed. However, in order to easily identify/differentiate the camera icons, the icons may be displayed while changing in color or shape.

In the flow chart in FIG. 5, display of a map or display of an index indicating a camera position is performed for groups registered in the camera management server 50 and users registered in the camera management server 50. However, in order to simplify the system, the groups serving as frames may be removed, and maps corresponding to respective users and indexes of the cameras may be displayed. A flow chart obtained at this time is shown in FIG. 12.

Figure 12:
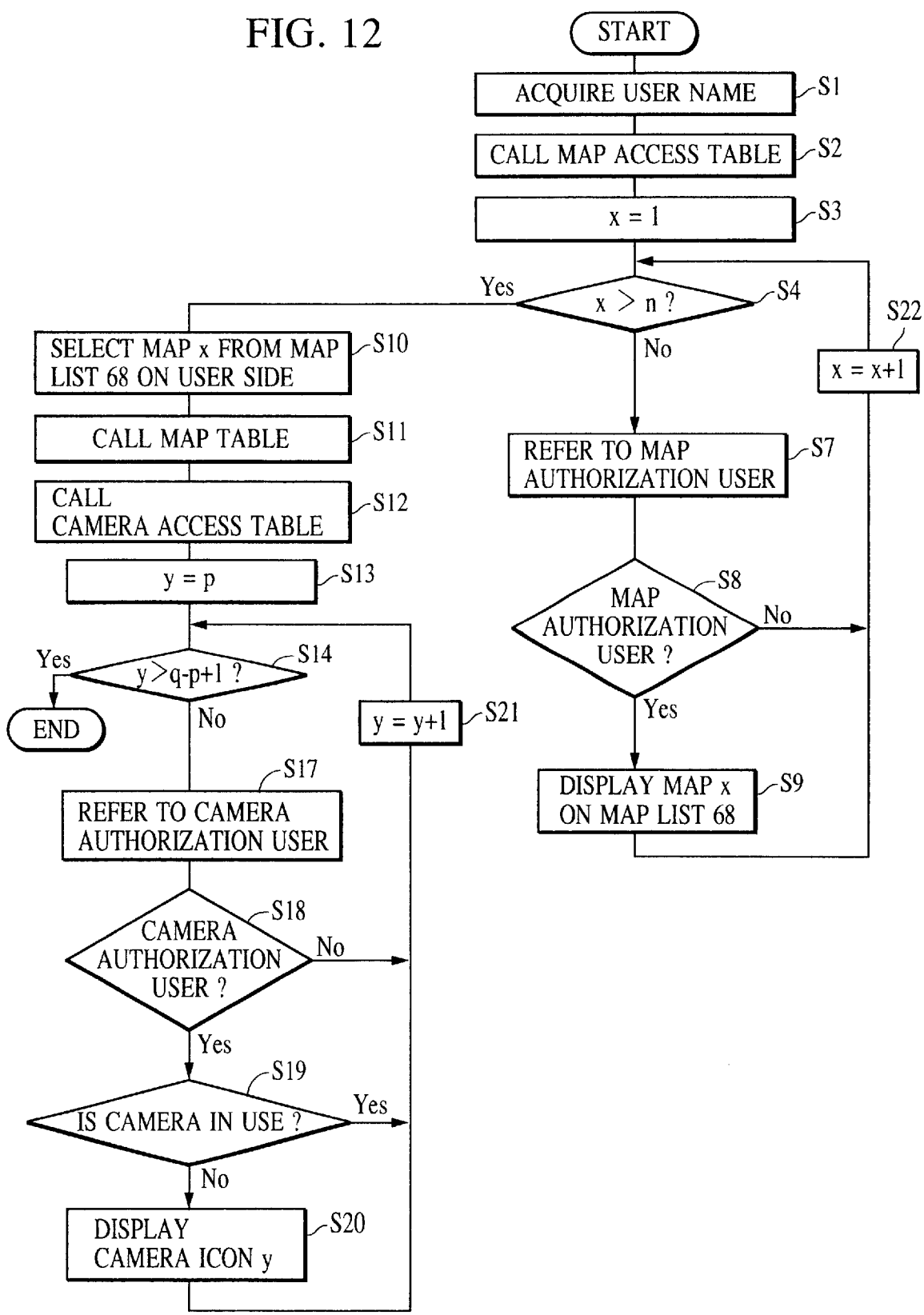
FIG. 12 is a flow chart showing an operation process of the video communication terminal.

In FIG. 12, as shown in FIG. 5, the process of map display authorization check and camera icon display authorization check performed by the camera control client 56 for a group to which a user belongs are omitted. Since the flow chart in FIG. 12 is the same as the flow chart in FIG. 5 except that the process is omitted, a description thereof will be omitted.

In the flow chart in FIG. 5 and the flow chart in FIG. 12, a map which is not authorized for a user is not displayed in the map list 68, and all the maps registered in the camera management server 50 are displayed in the map list 68. The following control may be performed. That is, if the user tries to select a map which is not authorized for the user from the maps displayed in the list, the map is inhibited from being displayed. With this control, a security level is kept high.

The flow chart of the operation process of the above video communication terminal is shown in FIG. 15. After a user name is acquired in step S21, the names of all the maps stored in the secondary storage device 26 are displayed in step S22. In step S23, it is assumed that map x is selected from a list displayed by the user. In this case, in step S24, the map authorization user of the map access table in FIG. 7 is referred to. If the user is authorized to access a map in step S25, then map x is displayed on the map window 60 in step S26. If the user is not authorized to access a map in step S25, then the flow shifts to step S27 to display a message "display disable" on the map window 60. Since the subsequent operation process is the same as that in FIG. 12, a description thereof will be omitted.

In the flow chart in FIG. 5 and the flow chart in FIG. 12, the icon of a camera which a user is not authorized to access is inhibited from being superposed on the map window 60 and displayed on the map window 60.

When the arrangement of the cameras is known by the user, but access to some cameras is prohibited, in order to help the user to use the system, the icons of cameras which can be remote-operated and the icons of cameras which are not authorized to be remote-operated may be displayed such that the icons are differentiated from each other (e.g., by different colors or shapes). When such a process is provided, a camera which can be remote-operated can be visually determined, and the system can be easily used.

Figure 14:
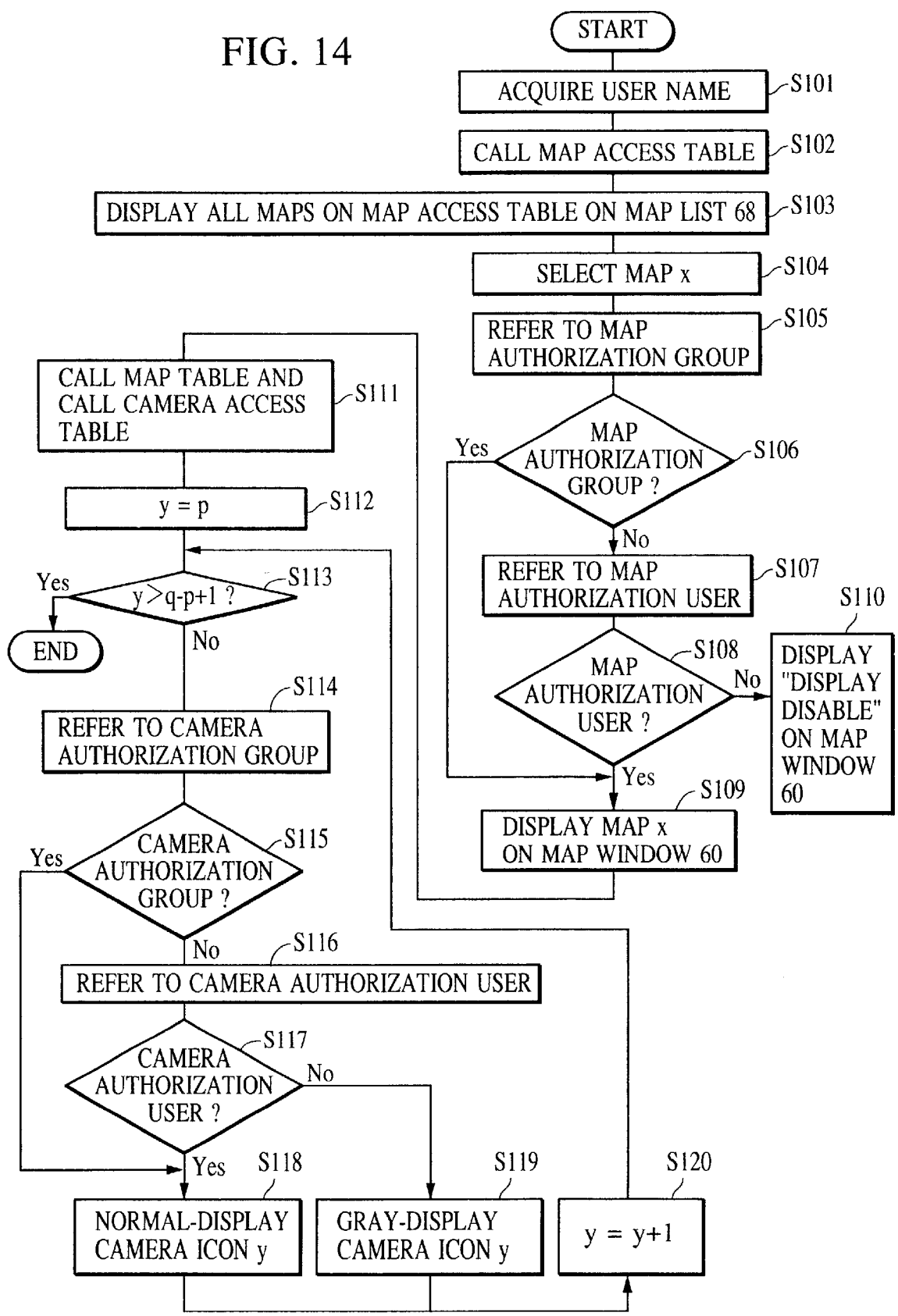
FIG. 14 is a flow chart showing an operation process of the video communication terminal.

The flow chart showing the process is shown in FIG. 14 and will be described below.

First, a user name is input to the video communication terminal 20 (S101). In response to this input, the camera control client 56 calls a group name to which the user belongs from the map access table which is obtained from the camera management server 50 in advance and stored in the secondary storage device 26 (S102).

The camera control client 56 displays all the maps on the called map access table on the map list 68 (S103).

When a user selects a certain map x from the map names displayed in the map list 68 (S104), the camera control client 56 first refers to the map authorization group on the map access table which is obtained from the camera management server 50 in advance and shown in FIG. 7 (S105).

If a group to which the user belongs is in the map authorization group in step S106, the camera control client 56 calls map x from the secondary storage device 26 to display map x on the map window 60 in step S109.

If the group to which the user belongs is not in the map authorization group in step S6, the map authorization user list on the camera access table in FIG. 7 is referred to (S107).

If a user belonging to a group which is not included in the map authorization group corresponds to the map authorization user list in step S108, then the camera control client 56 calls map x from the secondary storage device 26 to display map x on the map window 60 in step S109.

When the user does not correspond to the map authorization user list, the camera control client 56 displays "display disable" on the map window 60 to inhibit the display of map x (S110).

The camera control client 56 calls the map table shown in FIG. 6 or the camera access table shown in FIG. 9 from the secondary storage device 26 (S111).

First, the process is sequentially performed for camera p, camera p+1, . . . , camera y, . . . , camera q−1, and camera q from camera y=p according to the following procedure (S112).

In step S114, the camera control client 56 refers to the camera authorization group on the camera access table which is called from the secondary storage device 26 and shown in FIG. 9 to check whether the group to which the user belongs can be remote-operated with respect to camera p. As described above, the camera access table in FIG. 9 shows information corresponding to accessible cameras except for users and groups which are inhibited from accessing the cameras.

If the group to which a user belongs is included in the camera authorization group with respect to camera p in step S115, then the icon of camera p is ordinarily displayed on the map window 60 in step S118.

If the group to which the user belongs is not included in the camera authorization group with respect to camera p in step S115, then the camera control client 56 refers to the camera authorization user on the camera access table in FIG. 9 in step S116.

If a user determined not to belong to a camera authorization group is determined by the camera control client 56 to be a user which is next authorized to remote-operate camera p in step S117, then the icon of camera p is ordinarily displayed on the map window 60 in step S118.

If a user determined not to belong to the camera authorization group is determined by the camera control client 56 to be a user which is not authorized to remote-operate camera p with reference to the camera authorization group in step S117, then in step S119 the icon of camera p is displayed in a display manner different from the ordinary display manner of camera icons (i.e., in the color grey).

Upon completion of the process for camera p, y=p+1 is established in step S120, and the above process is executed by the camera control client 56 again.

If y>q−p+1 is established in step S113, i.e., the above process is executed for all the cameras on map x, then the display of a map and camera icons superposed on the map on the map window 60 is entirely completed.

Figure 13:
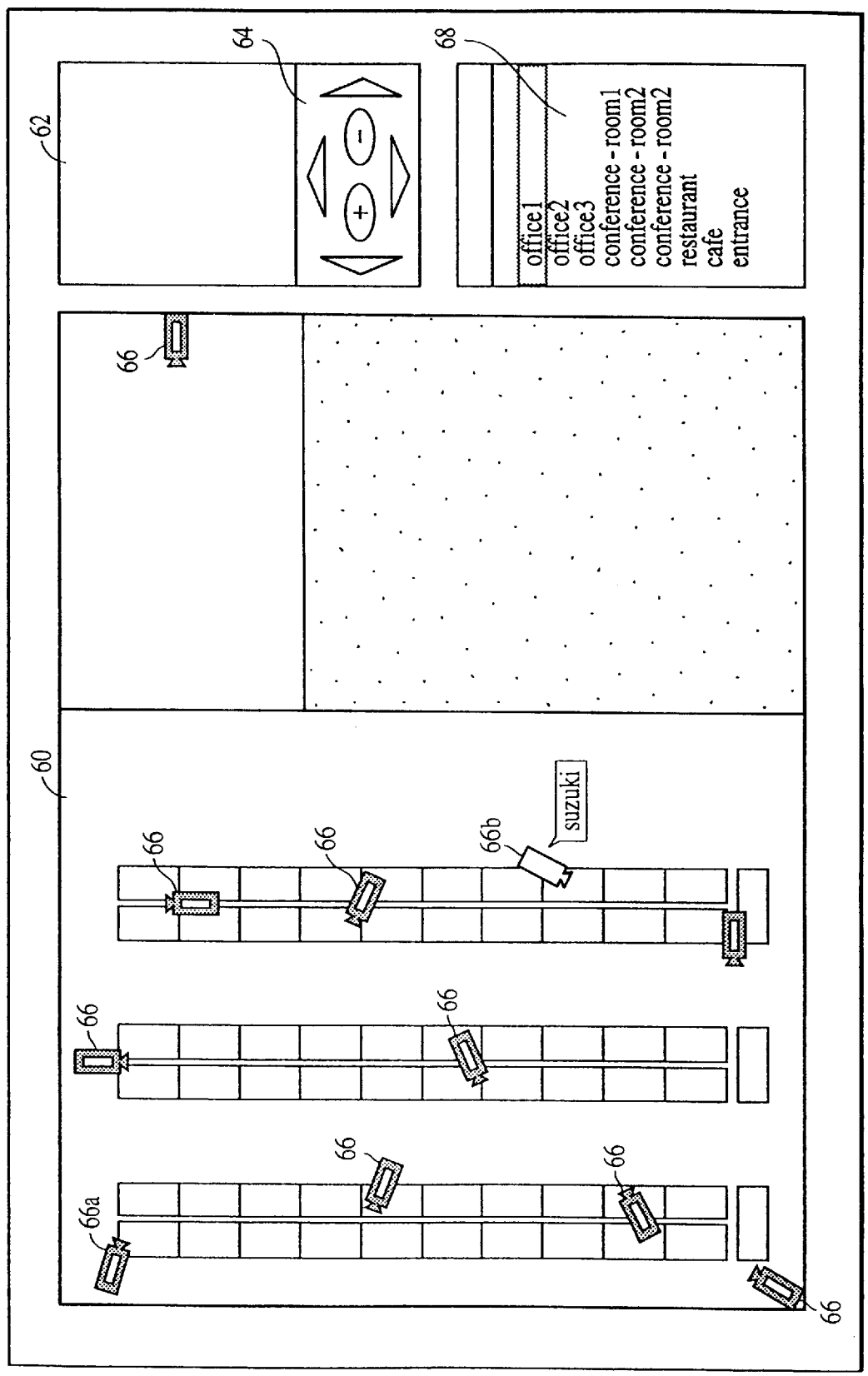
FIG. 13 is a view showing an example of a display screen.

Although the map of "office 1" is displayed in its entirely in FIG. 4, if there is an area which should not be known by a user, then the map shown in FIG. 13 (for example) may be displayed in map window 60.

In this case, a manager for the camera control system sets a display inhibition area which should not be displayed on the map window 60 with respect to certain selected users or groups, and information about the area is registered in the camera management server 50.

When a user tries to remote-operate a camera on a map, the camera control client 56 acquires the information about the display inhibition area on the map from the camera management server 50 in advance, and the camera control client 56 displays the display inhibition area on the map window 60 such that the display inhibition area is painted black according to the information, as shown in FIG. 13. At this time, in order to prevent the display inhibition area from being picked up by remote-operating a camera adjacent to the display inhibition area, the camera control server 54 controls the adjacent camera so as not to allow the camera to face the display inhibition area.

According to the map display system described above, a camera control system having a higher security level can be provided.

The present invention also can be achieved by another method. A storage media on which program codes of software for realizing the functions of the above embodiment are recorded is supplied to a system or an apparatus, in which a computer (or CPU or MPU) of the system or the apparatus reads and executes the program codes stored in the storage media.

In this case, the program codes themselves read from the storage media realize the functions of the embodiment described above, and the recording media in which the program codes are stored constitutes the present invention.

As a storage medium for supplying program codes, for example, a floppy disk, a hard disk, an optical disk, a magneto-optical disk, a CD-ROM, a CD-R, a magnetic tape, a nonvolatile memory card, a ROM, or the like can be used.

The present includes not only a case wherein the functions of the above embodiment are realized by executing program codes read by the computer, but also the following case. That is, an actual process is partially or entirely performed by an OS (operating system), which is active on the computer, on the basis of the instruction of the program codes, and the functions of the above embodiment are realized by the process.

In addition, after the program codes read from the storage medium are written in a memory mounted on a feature extension board inserted into the computer or a feature extension unit connected to the computer, a CPU or the like mounted on the feature extension board or function extension unit partially or entirely performs the actual process on the basis of the instruction of the program codes, and the functions of the above embodiment are realized by the process.

When the present invention is applied to storage media, program codes corresponding to the flow chart described above are stored in the storage media. In short, a module indispensable for the camera control system according to the present invention is stored in the storage medium.

According to the present embodiment, program codes of at least a "map selection module" for selecting a map which can be displayed for each user and a "camera selection module" for selecting a camera which can be accessed for each user may be stored in the storage media.

What is claimed is:

1. A video communication system for communicating with at least one camera which is connected to said video communication system via a network, said system comprising:
    a display device arranged to display a map;
    at least one index, superposed on the map, respectively indicating a position of said at least one camera on the map;
    a camera authorization setting device arranged to set an authorization state of a camera connected to the video communication system via the network, said authorization state indicating that said camera is authorized to be displayed as an index corresponding to said camera on a map, and inhibiting the display of an index corresponding to a camera which is connected to said video communication system via the network and which is not authorized to be displayed.

2. A video communication system according to claim 1, wherein a camera having an authorization state which authorizes said camera to be displayed is authorized to perform information communication with said display device.

3. A video communication system according to claim 2, further comprising a group authorization storage device arranged to store a group authorization, said group authorization indicating a group of terminals authorized to perform information communication with respect to said at least one camera, and wherein said camera authorization setting device sets the authorization state of said at least one camera in accordance with the group authorization stored in said group authorization storage means.

4. A video communication system according to claim 2, further comprising a user authorization storage device arranged to store a user authorization, said user authorization indicating users authorized to perform information communication with respect to said at least one camera, and wherein said camera authorization setting device sets the authorization state of said at least one camera in accordance with the user authorization stored in said user authorization storage means.

5. A video communication system according to claim 2, wherein a camera authorization setting device inhibits the display of an index corresponding to a camera which is used by another user.

6. A video communication system according to claim 2, wherein said information communication includes at least one of communication of a camera control command and communication of a camera video image.

7. A video communication system for communicating with at least one camera which is connected to said video communication system via a network, said system comprising:
- a map authorization setting device arranged to set an authorization state of a map, for each user, of a plurality of maps each of which indicates a location of said at least one camera, said authorization state indicating whether said map is authorized to be displayed;
- a map display device arranged to display a map out of the authorized maps; and
- a map display inhibition device arranged to inhibit said map display device from displaying a map which is not authorized by said map authorization setting device.

8. A video communication system according to claim 7, wherein said map display device displays the authorized maps in a list, and said map display inhibition device inhibits said map display device from displaying in the list a map which is not authorized.

9. A method of controlling a video communication system for communicating with at least one camera which is connected to the video communication system via a network, said method comprising:
- displaying a map for indicating a location of said at least one camera, and at least one index, superposed on the map, for respectively indicating a position of said at least one camera;
- setting an authorization state of a camera connected to said video communication system via the network, said authorization state indicating whether said camera is authorized to be displayed as an index corresponding to said camera; and
- inhibiting the display of an index corresponding to a camera, which is connected to said video communication system via the network and which is not authorized to be displayed.

10. A method according to claim 9, wherein a camera authorized to display the index corresponding to said camera is authorized to perform information communication.

11. A method according to claim 10, further comprising a step of storing a user authorization, the user authorization indicating users authorized to perform information communication with respect to the at least one camera, wherein the camera authorization setting step sets the authorization state of the at least one camera in accordance with the user authorization stored in the user authorization storing step.

12. A method according to claim 10, further comprising a step of storing a group authorization, said group authorization indicating a group of terminals authorized to perform information communication with respect to the at least one camera, and wherein the camera authorization setting step sets the authorization state of the at least one camera in accordance with the group authorization stored in the group authorization storing step.

13. A method according to claim 10, further comprising:
- managing the authorization state of each one of said at least one camera; and
- inhibiting the display of an index corresponding to a camera which is used by another user.

14. A method according to claim 10, wherein the information communication includes at least one of communication of a camera control command and communication of a camera video image.

15. A method of controlling a video communication system for communicating with at least one camera which is connected to the video communication system via a network, said method comprising:
- setting an authorization state of a map, for each user, of a plurality of maps each of which indicates a location of said at least one camera connected to the video communication system via the network, the authorization state indicating whether the map is authorized to be displayed;
- displaying a map out of the authorized maps; and
- inhibiting a screen from displaying a map which is not authorized.

16. A method according to claim 15, wherein the authorized maps are displayed in a list, and a map which is not authorized is not displayed in the list.

17. A terminal according to claim 15, wherein said display device displays the authorized maps in a list, and said map inhibition device inhibits said display device from displaying in the list a map which is not authorized.

18. A video communication terminal for communicating with at least one camera which is connected to a network, said terminal comprising:
- a display device arranged to display a map, and to display, superposed on the map, at least one index respectively indicating a position of said at least one camera on the map;
- a reception device arranged to receive information related to a camera of said at least one camera connected to the network, said information indicating that said camera is authorized to communicate; and
- an index display inhibition device arranged to inhibit said display device from displaying an index corresponding to a camera, which is connected to the network, other than a camera authorized to communicate on the basis of the information related to said camera received by said reception device.

19. A video communication terminal according to claim 18, wherein said terminal is able to perform information communication with said authorized camera.

20. A video communication terminal according to claim 19, wherein said information communication includes at least one of communication of a camera control command and communication of a camera video image.

21. A video communication terminal for communicating with at least one camera which is connected to a network, said terminal comprising:
- a reception device arranged to receive information related to a map of a plurality of maps each of which indicates a location of said at least one connected camera, said information indicating that said map is authorized to be displayed;
- a display device arranged to display at least one map out of the plurality of maps on the basis of the received information; and an inhibition device arranged to inhibit said display device from displaying a map which is not authorized to be displayed.

22. A video communication terminal according to claim 21, said terminal further comprising:

an inhibition device arranged to inhibit said display device from displaying a map other than a map authorized to be displayed.

23. A storage media in which a program for executing an operation process of a video communication terminal for communicating with at least one camera which is connected to the video communication terminal via a network, the program executing the processes of:

displaying a map for indicating a position where said at least one camera is located;

displaying superposed on a map displayed in said displaying process at least one index respectively indicating a position of said at least one camera;

receiving information related to a camera of said at least one camera connected to the video communication terminal via the network, said information indicating that said camera is authorized to be displayed superposed on a map as an index corresponding to said camera; and inhibiting the superposed display on a map displayed in the map displaying process of an index corresponding to a camera, which is connected to the video communication terminal via the network, other than a camera authorized to be displayed as an index corresponding to said camera on the basis of the information related to said camera received in said receiving process.

24. A storage media according to claim 23, wherein a camera authorized to be displayed superposed on a map as an index corresponding to said camera is authorized to perform information communication.

25. A storage media in which a program for executing an operation process of a video communication terminal for communicating with at least one camera which is connected to the video communication terminal via a network, said program executing the processes of:

receiving information related to a map of a plurality of maps, each of which indicates a location of said at least one camera connected to the video communication terminal via the network, said information indicating that said map is authorized to be displayed;

displaying at least one map out of the plurality of maps on the basis of the information received; and inhibiting a screen from displaying a map which is not authorized to be displayed.

26. A storage media according to claim 25, wherein the authorized maps are displayed in a list, and a map which is not authorized is not displayed in the list.

27. A video communication system for communicating with at least one camera which is connected to the video communication system via a network, comprising:

a camera authorization setting device arranged to set an authorization state of the at least one connected camera, said authorization state indicating that the at least one connected camera is authorized to be displayed as at least one index, each of which indicates a position of said at least one connected camera, on a map displayed on a screen; and an inhibition device arranged to inhibit a screen from displaying an index which indicates a position of a connected camera of said at least one connected camera, which isn't authorized to be displayed as the index by said camera authorization setting device.

* * * * *

UNITED STATES PATENT AND TRADEMARK OFFICE
CERTIFICATE OF CORRECTION

PATENT NO. : 6,608,649 B2
DATED : August 19, 2003
INVENTOR(S) : Kazuko Suzuki et al.

It is certified that error appears in the above-identified patent and that said Letters Patent is hereby corrected as shown below:

<u>Title page,</u>
Item [57], ABSTRACT,
Line 1, "corresponding" should read -- corresponding to --.

<u>Column 9,</u>
Line 44, "being" should read -- been --.

<u>Column 11,</u>
Line 13, "users" should read -- user's --.

<u>Column 13,</u>
Line 34, "entirely" should read -- entirety --.

<u>Column 14,</u>
Line 42, "map;" should read -- map; and --.

<u>Column 16,</u>
Line 28, "terminal" should read -- method --.

Signed and Sealed this

Thirteenth Day of January, 2004

JON W. DUDAS
*Acting Director of the United States Patent and Trademark Office*